No. 702,774. Patented June 17, 1902.
J. W. CADE.
SASH FASTENER OR HOLDER.
(Application filed July 24, 1901.)
(No Model.)

UNITED STATES PATENT OFFICE.

JAMES W. CADE, OF MOUNT CARMEL, SOUTH CAROLINA, ASSIGNOR TO CHARLES B. COWAN, OF DUEWEST, SOUTH CAROLINA.

SASH FASTENER OR HOLDER.

SPECIFICATION forming part of Letters Patent No. 702,774, dated June 17, 1902.

Application filed July 24, 1901. Serial No. 69,555. (No model.)

*To all whom it may concern:*

Be it known that I, JAMES W. CADE, a citizen of the United States, residing at Mount Carmel, in the county of Abbeville and State of South Carolina, have invented certain new and useful Improvements in Sash Fasteners or Holders, of which the following is a specification.

My invention relates to sash fasteners or holders, and has for its object to provide a simple, cheap, and effective device which may be readily applied and used in connection with windows of any ordinary or general construction or other moving part or parts and which may be adjusted so as to move freely with the window or to securely lock the same in any desired position; and to these ends it consists in a sash-fastener embodying the general features of construction and arrangement of parts having the general mode of operation substantially as hereinafter set forth.

Figure 1:
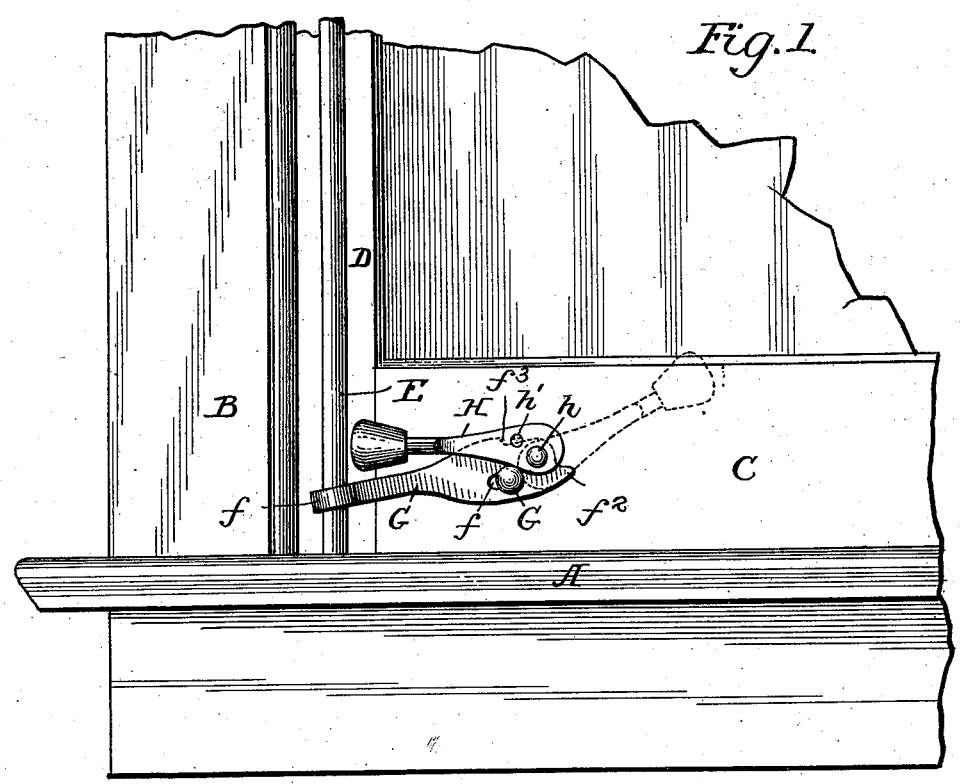
Figure 2:
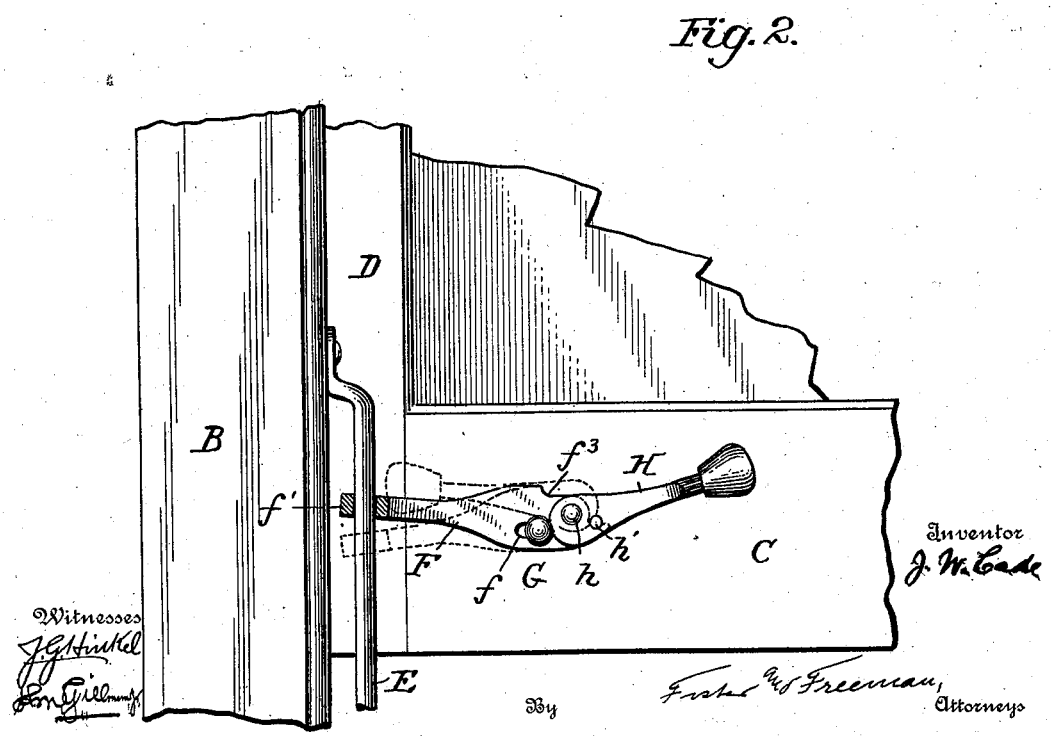

Referring to the accompanying drawings, Figure 1 is a view of a portion of a window-frame and a portion of a window-sash with the sash-fastener applied, and Fig. 2 is a similar view showing the sash-fastener applied and the window-sash raised.

While my improved fastener may be applied to many and various devices, as above indicated, I have chosen to show it in connection with an ordinary window frame and sash, and in the accompanying drawings A represents the sill of a window-frame, and B one of the uprights thereof; C, the lower cross-piece of the window-frame; D, one of the upright pieces of the same, and E a rod fixed on the window-sash in proper relation to the window-sash in any suitable or usual way. This is sufficient to illustrate the use of my improved fastening device; but of course it will be understood its use is not limited to the relations shown.

The fastener proper comprises a locking lever or bar F, which is pivotally mounted on the window-sash in any suitable way, and, as shown, it is mounted on a pivot G, being slotted at $f$, so as to have freedom of movement on the pivot. The free end of the locking-lever is provided with an opening $f'$, through which passes the fixed rod E, and this opening is of a size to normally permit the lever to slide freely on the rod when the sides of the opening are parallel or substantially parallel to the sides of the rod; but when the lever is inclined with relation to the rod so that the sides of the opening are in inclined relation to the sides of the rod the lever will grip the rod and be held securely in position, and it is obvious that the greater the pressure on the pivoted end of the lever under these conditions the tighter will the lever grip the rod.

In order to determine the relative position of the locking-lever with relation to the fixed rod, I provide a weighted lever H, which is suitably connected with the locking-lever, so that it can be adjusted in different positions with relation thereto and balance or overbalance the locking-lever, according to the position in which it is placed. In the present instance this weighted lever is pivoted to the locking-lever at a pivot-point $h$, and in order to control its movements the weighted lever is provided with a stud or projection $h'$, which engages a recess $f^2$ or $f^3$, formed in the end of the locking-lever, and this controls or limits the movements of the weighted lever with relation to the locking-lever. Any other suitable means for controlling these relations may be substituted, that shown being well adapted for the purposes intended.

In Fig. 1 the parts are shown in full lines in their locking position, with the window-sash closed, and it will be seen that the weighted lever H is thrown over, so as to lie substantially parallel with the locking-lever and so as to cause the free end of the locking-lever to be inclined with relation to the fixed rod and to cause the inner surfaces of the opening $f'$ to be inclined with relation to the surfaces of the fixed rod, so that the parts will be securely gripped and held in position, and when in this position no amount of strain upon the window-sash will raise it. When, however, it is desired to raise the window, the weighted lever H is thrown over to the position shown in dotted lines, Fig. 1, and in full lines in Fig. 2, which will have the effect of unlocking the locking-lever and counterbalancing it, so that the free end will tend to travel upward on the rod E. If, now, the window is raised from any point, the locking-lever will slide freely upward on the rod E, the weighted lever serving to counterbalance it to permit its sliding freely, and when the window is raised to the desired height and pressure removed therefrom the locking-lever will immediately grip the rod E and hold the window in elevated position, the parts then being as shown in full lines, Fig. 2. It will be observed that any pressure or weight on the window in this position tends to cause the locking-lever to more closely embrace the fixed rod and more securely hold the window in position.

When it it desired to lower the window, the weighted lever H is swung over to the position shown in dotted lines, Fig. 2, which tends to release the locking-lever and cause it to move freely downward along the fixed rod E, and as the window is lowered it will slide freely on the rod until the desired point is reached, when if the weighted lever is thrown to the position shown in full lines, Fig. 2, it will immediately cause the locking-lever to grip the fixed rod and hold the window in the desired elevated position. If, perchance, it is desired to lower the window to its extreme position, the weighted lever remains in the position shown in dotted lines, Fig. 2, until the window is closed, when, as before stated, the locking-lever will so engage the fixed rod that it will be impossible to raise the window until the locking-lever is released.

In the drawings I have shown a convenient and simple embodiment of the invention; but it will be understood that it can be embodied in any ornamental form and be of various constructions so long as it embodies the gist of my invention, which includes, broadly speaking, a locking-lever and a weighted lever connected thereto in such manner as to produce substantially the mode of operation hereinbefore set forth.

What I claim is—

1. In a window holding and locking device, the combination with a fixed rod, of a pivoted locking-lever the free end of which embraces the rod, and a weighted lever pivotally connected to the locking-lever and adapted to counterbalance and overbalance the latter, substantially as described.

2. In a window holding and locking device, the combination with a fixed rod, of a pivoted locking-lever having an opening through which the fixed rod passes, a weighted lever pivotally connected to the locking-lever, and a stud for controlling the position of the weighted lever with relation to the locking-lever, substantially as described.

3. In a window holding and locking device, the combination with a fixed rod, of a pivoted locking-lever having an opening with parallel sides through which the fixed rod passes and having recesses, and a weighted lever pivoted to the locking-lever, said weighted lever having a stud adapted to engage the recesses for controlling the position of the weighted lever, substantially as described.

In testimony whereof I have signed my name to this specification in the presence of two subscribing witnesses.

JAMES W. CADE.

Witnesses:
W. L. BURCH,
J. A. McALLISTER.